UNITED STATES PATENT OFFICE.

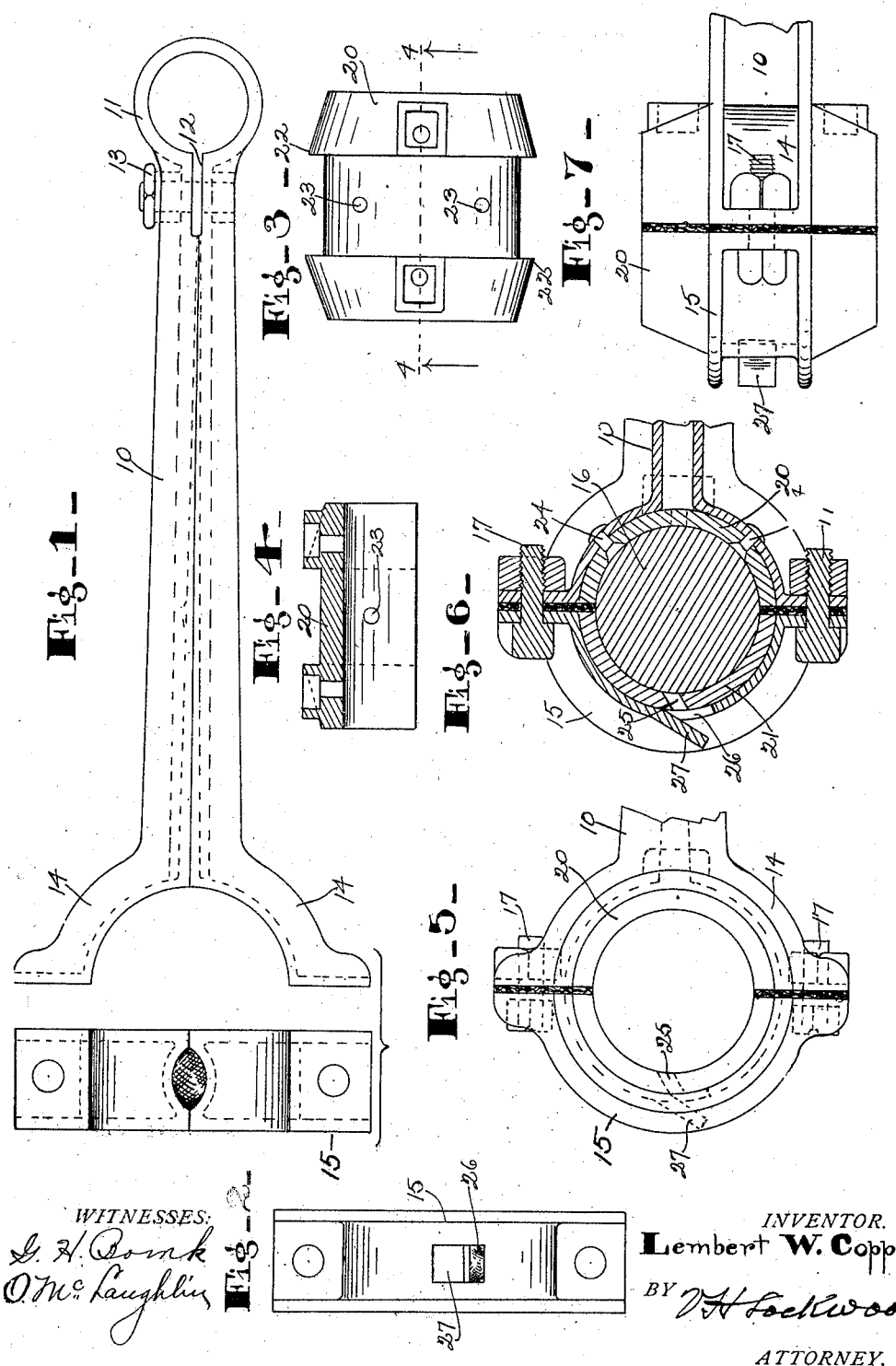

LEMBERT W. COPPOCK, OF DECATUR, INDIANA, ASSIGNOR OF ONE-HALF TO JESSE G. NIBLICK, OF DECATUR, INDIANA.

STEEL CONNECTING-ROD.

1,006,632.  Specification of Letters Patent.  Patented Oct. 24, 1911.

Application filed February 23, 1910. Serial No. 545,539.

*To all whom it may concern:*

Be it known that I, LEMBERT W. COPPOCK, of Decatur, county of Adams, and State of Indiana, have invented a certain new and useful Steel Connecting-Rod; and I do hereby declare that the following is a full, clear, and exact description thereof, reference being had to the accompanying drawings.

The object of this invention is to improve the construction of connecting rods and bearings therefor to be used on gasolene engines and the like.

The chief feature of this invention consists in a connecting rod formed essentially of a single piece of metal with the two ends or halves similarly formed and centrally bent to bring the two halves thereof together and electrically welding the same, the central portion, where the bend occurs, forming an eye, and the other end adapted separately or with another piece to form another eye for fitting on bearings, shafts or the like. This makes an extremely strong and convenient connecting rod. In addition to the foregoing is the means for tightening the bent end of the connecting rod so as to bring it in smooth engagement with the shaft or boxing on which it may be mounted. The large end is preferably formed by adding a semi-circular part, the parts being united together by clamping bolts through flanges, and one of said parts having a punched-out opening adapted to register with an opening in the bushing, whereby oil will be taken up during the revolution of the crank shaft on which said part may be mounted in an engine. Along with the foregoing is a peculiar arrangement of bushing for completing the connecting rod.

The nature of the invention will be understood from the accompanying drawings and the following description and claim.

In the drawings Figure 1 is a side and end elevation of the main portion of the connecting rod. Fig. 2 is an outside elevation of the detached portion of the connecting rod. Fig. 3 is an elevation of the bushing. Fig. 4 is a section partly therethrough on the line 4—4 of Fig. 3. Fig. 5 is a side elevation of the larger end of the connecting rod in completed form, the remainder being broken away. Fig. 6 is a central vertical section through Fig. 5. Fig. 7 is a plan view of Fig. 5.

The major portion 10 of said connecting rod is formed of a single piece of metal, with the central portion 11 thereof flattened and thinned so as to be bent and so that when said bar of metal is centrally bent, the two halves thereof, which are similar in form, will come together and meet throughout their length, as shown in Fig. 1. When said bar is bent, these two halves are electrically welded so as to make a practically solid rod between the ends. The central portion 11 of the bar, when thus bent, forms an eye adapted to be mounted on a shaft or pin in the piston, and the portion of the rod adjacent said eye 11 is centrally and longitudinally cut out to form the slot 12, and through said portion of the rod a tightening bolt 13 extends whereby said eye 11 may be tightened down to make a proper and satisfactory seat on the pin or shaft on which it is mounted. The extreme ends 14 of the bar from which the rod is made are similarly bent, curved or formed quadrant-shaped so that when they are brought together, as shown in Fig. 1, they will be semi-circular and will coöperate with the detached portion 15, for forming an enlarged eye for mounting the rod on the crank shaft 16 or other shaft, as desired. The part 15 is secured to the parts 14 of the connecting rod by screws 17, as seen in Fig. 6.

The enlarged portion of the connecting rod contains a bushing formed of two semi-circular halves 20 and 21, each centrally and annularly recessed to leave annular shoulders 22 that fit on each side of the connecting rod. The half 20 of the bushing has holes 23 whereby it is secured to the main portion of the connecting rod by rivets 24. The other half 21 of the bushing is provided with an opening 25 which registers with an opening 26 punched out of the detached member 15 of the connecting rod. The punched out tongue 27 projects tangentially so that as the crank shaft 16 revolves, the tongue 27 will catch oil in the crank casing and cause the oil to be thrown through the openings 26 and 25, and thus the bearing between the bushing 21 and the crank shaft will be kept lubricated.

What I claim as my invention and desire to secure by Letters Patent is:

A pressed-steel connecting rod for engines consisting of a central body portion formed of two longitudinal parts welded together, an eye at one end formed by centrally bending the material constituting said connecting rod and the other end of each welded half of said connecting rod spread in the arc of a circle, a semi-circular member, said semi-circular member having a tongue punched out of the same centrally, means for securing said member to the bifurcated end of the connecting rod, and a split bushing with one half riveted to the spread end of the connecting rod and the other half provided with a hole that registers with the punched out opening through said semi-circular member.

In witness whereof, I have hereunto affixed my signature in the presence of the witnesses herein named.

LEMBERT W. COPPOCK.

Witnesses:
BERNARD T. TIRVEER,
ARTHUR D. SUTTLER.